D. C. RIPLEY.
Jelly-Glasses.

No. 139,081.

Patented May 20, 1873.

WITNESSES
R. E. Henderson
E. C. Sitler

INVENTOR
Daniel C. Ripley
by his atty
Bakewell Christy & Kerr

UNITED STATES PATENT OFFICE.

DANIEL C. RIPLEY, OF PITTSBURG, PENNSYLVANIA.

IMPROVEMENT IN JELLY-GLASSES.

Specification forming part of Letters Patent No. 139,081, dated May 20, 1873; application filed April 30, 1873.

*To all whom it may concern:*

Be it known that I, DANIEL C. RIPLEY, of Pittsburg, in the county of Allegheny and State of Pennsylvania, have invented a new and useful Improvement in Jelly-Glasses; and I do hereby declare the following to be a full, clear, and exact description thereof, reference being had to the accompanying drawing forming a part of this specification, in which—

Figure 1:
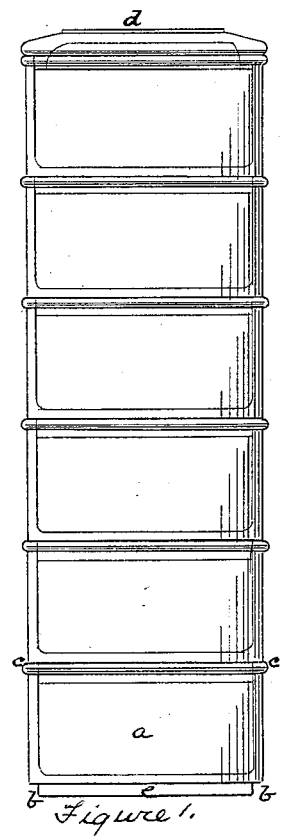
Figure 2:
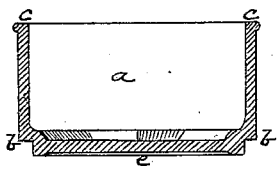

Figure 1 is a side elevation of a pile or column of jelly-glasses; and Fig. 2 is a vertical section of one of the same.

Like letters of reference indicate like parts in each.

My invention consists of a jelly-glass of suitable shape, and furnished with a suitable joint or connection, whereby one glass may be placed above another, so that the upper one shall form a cover for the lower one; such glasses being all formed alike, so that they may be piled one above the other, to form a column, the top glass of which is closed or furnished with a suitable lid or cover.

To enable others skilled in the art to make and use my invention, I will describe its construction and use more fully.

The glass *a*, which I term an individual jelly-glass, is pressed in a suitably-formed mold to give it the shape shown. This glass is provided with a shoulder, *b*, which extends all around the base, while its upper lip is made of such shape that, when a similar glass is placed thereon, the shoulder *b* shall rest upon the lip *c*, and the base shall project down into the glass so as form a lid for the lower glass; in like manner, another glass may be placed above the second one, so as to form a pile or column, such as is shown in Fig. 1. The upper glass is closed by a cap of any suitable construction; but I prefer to make this cap *d* of glass, because of its more ornamental appearance.

This feature of this jelly-glass is designed for convenience in packing, and in stowing the glasses away in cupboards, &c., when filled with jelly. As jelly-glasses have been made heretofore, it has been impossible to place them one above the other without danger of their being displaced and broken, there being no provision for holding them; this made not only a great loss of room in pantries and shelves which were designed to hold them, but also rendered them very inconvenient to handle and to pack. It is also my design in this case to make the glass of small size, so that it may be fitted for an individual jelly-glass; as this makes the glass very small, it would be exceedingly troublesome to handle, if it were not that it could be packed and placed in columns, as shown.

If it is desired, the form of joint may be changed; the shoulder may be made around the mouth or lip of the glass, so as to receive a downward-projecting flange around the base of the upper glass, while the lip extends up in a suitable cavity inside the base of the upper glass. The glasses forming the pile or column may be secured together by passing a suitable band around the column from top to bottom; an ordinary rubber band is the best suited for this purpose.

This glass is designed to be used as a mold, out of which the jelly is turned upon a suitable dish when required for use.

As this particular glass is designed to contain but a small quantity of jelly, and as the reduction of the width of the same for the purpose of reducing its capacity would give it a bottle-like shape, I make the diameter of the glass to exceed its height, and thereby secure a form which is suitable for piling, and, at the same time, a reduced capacity of the glass, so that it may be used for an individual jelly-glass.

What I claim as my invention, and desire to secure by Letters Patent, is—

1. A jelly-glass, having a base and lip of such shape that the same may be used in forming a pile of similar glasses, in which the base of each glass forms a cap or lid for the next lower one, substantially as and for the purposes described.

2. A pile or column of jelly-glasses, arranged one above the other, the base of each glass forming the cap or lid of the glass directly under it; the glass at the apex of the column being closed by any suitable detached lid, substantially as and for the purposes described.

3. As a new article of manufacture, a jelly-glass the diameter of which exceeds the height, substantially as described.

In testimony whereof I, the said DANIEL C. RIPLEY, have hereunto set my hand.

DANIEL C. RIPLEY.

Witnesses:
   A. S. NICHOLSON,
   THOS. B. KERR.